United States Patent
Kuriyama et al.

(10) Patent No.: US 12,166,549 B2
(45) Date of Patent: Dec. 10, 2024

(54) WIRELESS COMMUNICATION SYSTEM, WIRELESS COMMUNICATION METHOD AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 383 days.

(21) Appl. No.: 17/635,457

(22) PCT Filed: Aug. 20, 2019

(86) PCT No.: PCT/JP2019/032444
§ 371 (c)(1),
(2) Date: Feb. 15, 2022

(87) PCT Pub. No.: WO2021/033265
PCT Pub. Date: Feb. 25, 2021

(65) Prior Publication Data
US 2022/0302974 A1  Sep. 22, 2022

(51) Int. Cl.
*H04B 7/0452* (2017.01)
*H04B 7/06* (2006.01)
*H04B 17/336* (2015.01)

(52) U.S. Cl.
CPC ......... *H04B 7/0617* (2013.01); *H04B 7/0632* (2013.01); *H04B 17/336* (2015.01); *H04B 7/0452* (2013.01)

(58) Field of Classification Search
None
See application file for complete search history.

(56) References Cited

U.S. PATENT DOCUMENTS

| 10,924,230 B1* | 2/2021 | Marupaduga ......... H04L 5/0073 |
| 2008/0117997 A1* | 5/2008 | Maltsev ............. H04L 25/0248 |
| | | 375/267 |

(Continued)

FOREIGN PATENT DOCUMENTS

| JP | 2018113562 A | 7/2018 |
| JP | 2018133700 A | 8/2018 |

(Continued)

OTHER PUBLICATIONS

Yano, Kazuto et al., "Effect Of MMSE Reception On Downlink Multiuser MIMO OFDM Transmission Over Time-Variant Channel", The Institute of Electronics, Information and Communication Engineers 2012 Communication Society Conference Proceedings 1, Aug. 28, 2012, p. 421.

(Continued)

*Primary Examiner* — The Hy Nguyen

(57) ABSTRACT

In a wireless communication system for performing single-carrier MIMO transmission, a transmitting station apparatus includes a training signal generation unit and a transmit beamforming unit that performs transmit beamforming processing using transmit weights and a receiving station apparatus includes a communication path estimation unit, an interference amount determination unit that determines whether or not a residual inter-stream interference exceeds a predetermined threshold value, a receive weight calculation unit that calculates a receive weight used for receive beamforming processing when the residual inter-stream interference exceeds the threshold value, and a receive beamforming unit that performs receive beamforming pro- (Continued)

cessing for suppressing residual inter-stream interferences using the receive weight.

7 Claims, 9 Drawing Sheets

(56) References Cited

U.S. PATENT DOCUMENTS

| | | |
|---|---|---|
| 2012/0077485 A1* | 3/2012 | Shin .................. H04B 7/0617 455/422.1 |
| 2015/0358103 A1 | 12/2015 | Ohwatari et al. |
| 2018/0323848 A1 | 11/2018 | Mizusawa |
| 2019/0222246 A1 | 7/2019 | Takahashi et al. |
| 2019/0363765 A1 | 11/2019 | Yoshioka et al. |
| 2020/0052745 A1 | 2/2020 | Yoshioka et al. |

FOREIGN PATENT DOCUMENTS

| | | |
|---|---|---|
| WO | WO-2014115374 A1 | 7/2014 |
| WO | WO-2017086011 A1 | 5/2017 |
| WO | WO-2018073851 A1 | 4/2018 |

OTHER PUBLICATIONS

Keita Kuriyama, Hayato Fukuzono, Masafumi Yoshioka, Tsutomu Tatsuta, "Wide-band Single-Carrier MIMO System Using FIR-type Transmit Beamforming and Bi-Directional Receive Equalization", IEICE General Conference, B-5-105, Mar. 2019.

Toshihisa Nabeya, et al., "Transmit beamforming Technology for High-Speed Wireless LAN", Toshiba Review, vol. 65 No. 4, pp. 48-51, Apr. 2010.

Kanako Yamaguchi, et al., "Considerations on Prediction Effects of Multi-User MIMO Channels in Time-Varying Environments", IEICE Technical Report, AP2013-107, pp. 43-48, Nov. 2013, Nov. 2013.

* cited by examiner

WIRELESS COMMUNICATION SYSTEM, WIRELESS COMMUNICATION METHOD AND RECEIVING STATION DEVICE

CROSS-REFERENCE TO RELATED APPLICATIONS

This application is a 371 U.S. National Phase of International Application No. PCT/JP2019/032444, filed on Aug. 20, 2019. The entire disclosure of the above application is incorporated herein by reference.

TECHNICAL FIELD

The present invention relates to a technology for suppressing residual inter-stream interferences in a wireless communication system for performing single carrier multiple-input multiple-output (SC-MIMO) transmission using finite impulse response (FIR) beamforming.

BACKGROUND ART

Processing for removing inter-stream interferences is required when SC-MIMO transmission is performed. Thus, a method of removing inter-stream interferences by FIR transmit beamforming that constitutes a linear equalizer in the time domain (referred to as FIR transmit beamforming) has been studied (see, for example, NPL 1). In FIR transmit beamforming, transmit weights for transmit beamforming processing are calculated based on a transfer function matrix of channel impulse responses (CIRs) acquired by channel state information (CSI) estimation. A method in which the occurrence of residual inter-stream interferences is suppressed by frequently acquiring a CIR matrix and updating transmit weights has also been proposed (see, for example, NPL 2). Further, a method of updating transmit weights at short intervals by channel prediction has been proposed (see, for example, NPL 3).

CITATION LIST

Non Patent Literature

NPL 1: Keita Kuriyama, Hayato Fukuzono, Masafumi Yoshioka, Tsutomu Tatsuta, "Wide-band Single-Carrier MIMO System Using FIR-type Transmit Beamforming and Bi-Directional Receive Equalization", IEICE General Conference, B-5-105, 2019.
NPL 2: Toshihisa Nabeya et al., "Transmit beamforming Technology for High-Speed Wireless LAN", Toshiba Review, Vol. 65 No. 4, pp. 48-51, 2010
NPL 3: Kanako Yamaguchi et al., "Considerations on Prediction Effects of Multi-User MIMO Channels in Time-Varying Environments", IEICE Technical Report, AP2013-107, pp. 43-48, 2013-11

SUMMARY OF THE INVENTION

Technical Problem

In NPL 1, the transmit weights are updated at the timing of acquiring a CIR matrix, but there is a problem that appropriate transmit beamforming cannot be performed and inter-stream interferences remain if CIRs change before the transmit weights are updated. In NPL 2, the transmitting side needs to frequently acquire a CIR matrix and there is a problem that frequent feedback from the receiving side to the transmitting side causes deterioration of transmission efficiency. In NPL 3, there is a concern that inter-stream interferences may increase due to prediction errors in channel prediction.

It is an object of the present invention to provide a wireless communication system, a wireless communication method, and a receiving station apparatus that can avoid deterioration of communication quality by suppressing residual inter-stream interferences caused by changes of channels over time without causing deterioration of the transmission rate in the wireless communication system for performing SC-MIMO transmission using FIR beamforming.

Means for Solving the Problem

A wireless communication system according to the present invention is a wireless communication system for performing single-carrier MIMO transmission between a transmitting station apparatus and a receiving station apparatus. The transmitting station apparatus includes: a training signal generation unit configured to generate a predetermined known signal shared with the receiving station apparatus; and transmit beamforming unit configured to perform transmit beamforming processing using a transmit weight for removing an inter-stream interference, the transmit weight being calculated based on a communication path response that the receiving station apparatus has estimated from the known signal. The receiving station apparatus includes: a communication path estimation unit configured to estimate the communication path response based on the known signal received from the transmitting station apparatus; an interference amount determination unit configured to determine whether or not a residual inter-stream interference estimated based on the known signal transmitted from the transmitting station apparatus exceeds a predetermined threshold value; a receive weight calculation unit configured to calculate a receive weight used for receive beamforming processing for suppressing residual inter-stream interferences when the residual inter-stream interference exceeds the threshold value; and a receive beamforming unit configured to perform receive beamforming processing for suppressing residual inter-stream interferences using the receive weight.

A wireless communication method according to the present invention is a wireless communication method for performing single-carrier MIMO transmission between a transmitting station apparatus and a receiving station apparatus. The method includes: generating, by the transmitting station apparatus, a predetermined known signal shared with the receiving station apparatus; and performing, by the transmitting station apparatus, transmit beamforming processing using a transmit weight for removing an inter-stream interference, the transmit weight being calculated based on a communication path response that the receiving station apparatus has estimated from the known signal, and estimating, by the receiving station apparatus, the communication path response based on the known signal received from the transmitting station apparatus; determining, by the receiving station apparatus, whether or not a residual inter-stream interference estimated based on the known signal transmitted from the transmitting station apparatus exceeds a predetermined threshold value; calculating, by the receiving station apparatus, a receive weight used for receive beamforming processing for suppressing residual inter-stream interferences when the residual inter-stream interference exceeds the threshold value; and suppressing, by the receiving station apparatus, residual inter-stream interferences using the receive weight.

A receiving station apparatus according to the present invention is a receiving station apparatus for performing single-carrier MIMO transmission with a transmitting station apparatus. The receiving station apparatus includes: a communication path estimation unit configured to estimate a communication path response based on a predetermined known signal received from the transmitting station apparatus; an interference amount determination unit configured to determine whether or not a residual inter-stream interference estimated based on the known signal transmitted from the transmitting station apparatus exceeds a predetermined threshold value; a receive weight calculation unit configured to calculate a receive weight used for receive beamforming processing for suppressing residual inter-stream interferences when the residual inter-stream interference exceeds the threshold value; and a receive beamforming unit configured to perform receive beamforming processing for suppressing residual inter-stream interferences using the receive weight.

Effects of the Invention

The wireless communication system, the wireless communication method, and the receiving station apparatus according to the present invention can avoid deterioration of communication quality by suppressing residual inter-stream interferences caused by changes of channels over time without causing deterioration of the transmission rate in the wireless communication system for performing SC-MIMO transmission using FIR beamforming.

DESCRIPTION OF EMBODIMENTS

Hereinafter, embodiments of a wireless communication system, a wireless communication method, and a receiving station apparatus according to the present invention will be described with reference to the drawings.

Figure 1:
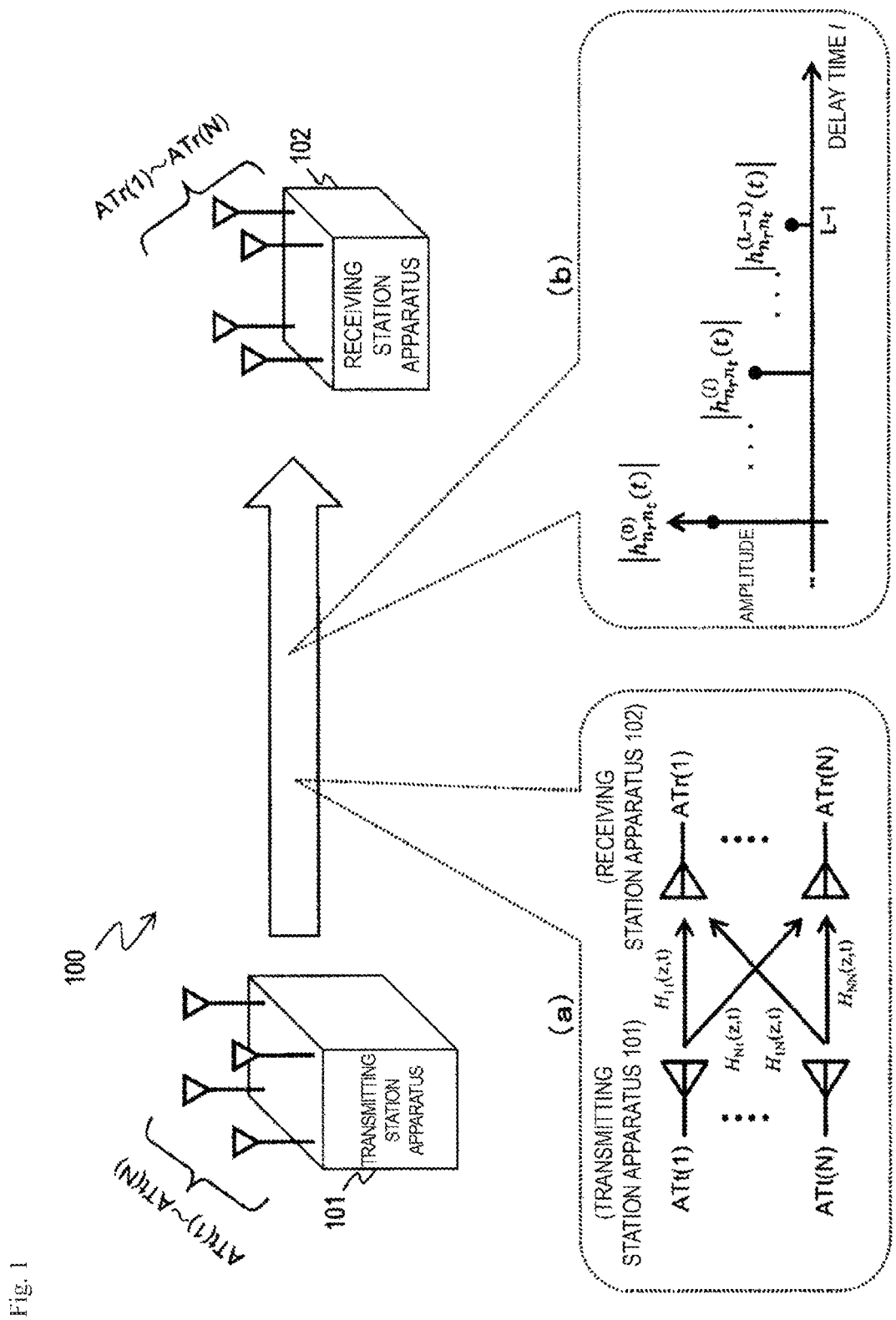
FIG. 1 is a diagram illustrating an example of a wireless communication system for performing single-carrier MIMO transmission.

FIG. 1 illustrates an example of a wireless communication system 100 that performs single-carrier MIMO (SC-MIMO) transmission. The wireless communication system 100 illustrated in FIG. 1 is an example of N×N MIMO (where N is an integer of N>2) which is common to embodiments that will be described later. In FIG. 1, the wireless communication system 100 includes a transmitting station apparatus 101 having N antennas ATt(1) to ATt(N) and a receiving station apparatus 102 having N antennas ATr(1) to ATr(N) and performs wireless communication between the transmitting station apparatus 101 and the receiving station apparatus 102. Here, in the following description, the antennas ATt(1) to ATt(N) of the transmitting station apparatus 101 are each referred to as an antenna ATt with (number) omitted at the end of the symbol when a common description is given with respect to the antennas ATt(1) to ATt(N), and referred to with (number) added at the end of the symbol when indicating a specific antenna, for example, as an antenna ATt(1). The antennas ATr(1) to ATr(N) of the receiving station apparatus 102 will also be referred to in the same manner. The same applies when a plurality of identical blocks are provided.

The wireless communication system 100 according to each embodiment that will be described below performs wireless communication through an SC-MIMO method using a plurality of antennas between the transmitting station apparatus 101 and the receiving station apparatus 102. Here, in wireless communication paths between the transmitting station apparatus 101 and the receiving station apparatus 102, there are a plurality of delayed waves having different delay times such as multipath ones, and frequency-selective fading occurs. Therefore, in the example of FIG. 1, inter-stream interferences due to spatial spread occur between the N antennas of the transmitting station apparatus 101 and the N antennas of the receiving station apparatus 102. Inter-symbol interferences due to temporal spread also occur in signals transmitted and received between the antennas of the transmitting station apparatus 101 and the receiving station apparatus 102. Here, when communication path responses (CIRs) of wireless communication paths between the transmitting station apparatus 101 and the receiving station apparatus 102 are H(z), the communication path responses H(z) can be represented as a matrix of transfer functions (referred to as a transfer function matrix) having N×N elements corresponding to the number of antennas.

FIG. 1(a) illustrates an example of the transfer functions between the antennas, where the transfer function at time t between the antenna ATt(1) and the antenna ATr(1) is $H_{11}(z, t)$, the transfer function at time t between the antenna ATt(1) and the antenna ATr(N) is $H_{N1}(z, t)$, the transfer function at time t between the antenna ATt(N) and the antenna ATr(1) is $H_{1N}(z, t)$, and the transfer function at time t between the antenna ATt(N) and the antenna ATr(N) is $H_{NN}(z, t)$. In this case, the transfer function matrix H(z, t) is represented by equation (1).

[Math. 1]

$$H(z, t) = \begin{bmatrix} H_{11}(z, t) & \cdots & H_{1N}(z, t) \\ \vdots & \ddots & \vdots \\ H_{N1}(z, t) & \cdots & H_{NN}(z, t) \end{bmatrix} \quad (1)$$

Here, the transfer function matrix H(z, t) represents the CIRs of N×N MIMO as follows.

$$H(z,t) \in \mathbb{C}^{N \times N} \qquad \text{[Math. 2]}$$

Here, C represents a set of matrix elements, and for example, $\mathbb{C}^{N \times N}$ has (N×N) elements.

FIG. 1(b) illustrates a delay profile of delayed waves between an $n_r$-th receiving antenna and an $n_t$-th transmitting antenna at time t, where the horizontal axis indicates the delay time 1. L indicates the number of delayed waves from the 0th to the L-1th (where L is a positive integer).

Here, each element in equation (1) can be expressed as an FIR transfer function $H_{n_r n_t}(z, t)$ as shown in equation (2). The subscripts $n_r$ and $n_t$ of the symbols H and h in equation (2) will be referred to as nr and nt as in $H_{nmt}(z, t)$ when written in text. The same applies to the subscripts of other symbols.

[Math. 3]

$$H_{n_r n_t}(z, t) = \sum_{l=0}^{L-1} h^{(l)}_{n_r n_t}(t) z^{-l} \quad (2)$$

About Residual Inter-Stream Interference

Here, a problem in performing FIR transmit beamforming by the transmitting station apparatus 101 will be described using an example of 2×2 MIMO.

An equivalent CIR (equivalent communication path response) matrix obtained by performing FIR beamforming for suppressing inter-stream interferences is represented by equation (3) in the case of 2×2 MIMO with N=2.

[Math. 4]

$$H(z, t)adj(H(z, t)) = \begin{bmatrix} H_{11}(z, t) & H_{12}(z, t) \\ H_{21}(z, t) & H_{22}(z, t) \end{bmatrix} \quad (3)$$

$$\begin{bmatrix} H_{22}(z, t) & -H_{12}(z, t) \\ -H_{21}(z, t) & H_{1}(z, t) \end{bmatrix} = \begin{bmatrix} H_{11}(z, t)H_{22}(z, t) - H_{12}(z, t)H_{21}(z, t) & 0 \\ 0 & H_{11}(z, t)H_{22}(z, t) - H_{22}(z, t)H_{21}(z, t) \end{bmatrix}$$

adj(H(z, t)) represents an adjugate matrix. Note that adj is different from an adjoint matrix that represents a Hermitian transpose. Here, the adjugate matrix adj(H(z, t)) has (N×N) elements as follows.

$$\mathrm{adj}(H(z,t)) \in \mathbb{C}^{N \times N} \qquad \text{[Math. 5]}$$

In equation (3), inter-stream interferences have been removed because off-diagonal elements of H(z, t)adj(H(z, t)) representing the inter-stream interference components are 0.

However, the transmitting station apparatus 101 uses adj(H(z, t)) calculated based on H(z, t) as transmit weights used for FIR transmit beamforming until the transmitting station apparatus 101 acquires a new CIR. That is, adj(H(z, t)) is not updated until transmit weights are calculated using new CIRs. In particular, even if CIRs have changed to H(z, t+τ) due to changes over time after the CIRs are acquired (after time ti has elapsed), the adj(H(z, t)) of the time τ ago is used as the transmit weights, such that the off-diagonal elements of equation (3) are not 0 and inter-stream interferences remain as shown in equation (4), causing a problem that communication quality deteriorates.

[Math. 6]

$$H(z, t+\tau)adj(H(z, t)) = \begin{bmatrix} H_{22}(z, t)\{H_{11}(z, t) + \Delta_{11}(z, t+\tau)\} - & H_{11}(z, t)\Delta_{12}(z, t+\tau) - \\ H_{21}(z, t)\{H_{12}(z, t) + \Delta_{12}(z, t+\tau)\} & H_{12}(z, t)\Delta_{11}(z, t+\tau) \\ H_{22}(z, t)\Delta_{21}(z, t+\tau) - & H_{11}(z, t)\{H_{22}(z, t) + \Delta_{22}(z, t+\tau)\} - \\ H_{21}(z, t)\Delta_{22}(z, t+\tau) & H_{12}(z, t)\{H_{21}(z, t) + \Delta_{21}(z, t+\tau)\} \end{bmatrix} \quad (4)$$

Here, equation (4) represents an equivalent CIR matrix at time t+τ obtained through multiplication by the transmit weights.

The CIR matrix at time t (used to calculate the transmit weights) is represented by equation (5).

[Math. 7]

$$H(z, t) = \begin{bmatrix} H_{11}(z) & H_{12}(z) \\ H_{21}(z) & H_{22}(z) \end{bmatrix} \quad (5)$$

The CIR matrix at time t+τ is represented by equation (6).

[Math. 8]

$$H(z, t+\tau) =$$
$$H(z, t) + \Delta(z, t+\tau) = \begin{bmatrix} H_{11}(z, t) + \Delta_{11}(z, t+\tau) & H_{12}(z, t) + \Delta_{12}(z, t+\tau) \\ H_{21}(z, t) + \Delta_{21}(z, t+\tau) & H_{22}(z, t) + \Delta_{22}(z, t+\tau) \end{bmatrix} \quad (6)$$

Here, the equivalent CIR matrix obtained by multiplying equation (6) by the transmit weights is equation (4).

In order to prevent residual inter-stream interferences, it is necessary to estimate new CIRs and update transmit weights before the CIRs greatly change. For this purpose, it is required for the receiving station apparatus 102 to frequently estimate CIRs and feed back the estimated CIRs to the transmitting station apparatus 101, which causes a problem that the transmission rate deteriorates.

Here, a case where estimation of CIRs and feedback of estimation results are performed frequently will be described as a comparative example to make it easy to understand the advantages of the wireless communication system 100 according to the present embodiment that will be described below.

Figure 2:
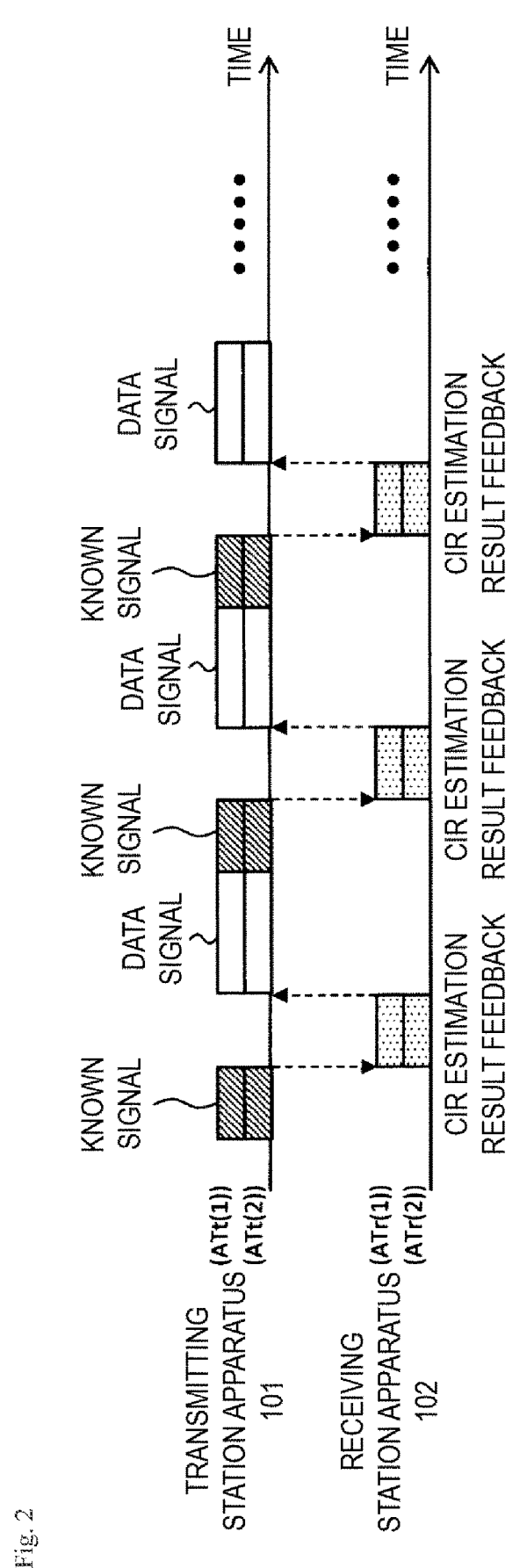
FIG. 2 is a diagram illustrating an example of a frame sequence of a comparative example.

FIG. 2 illustrates an example of a frame sequence of the comparative example. FIG. 2 illustrates an example of 2×2 MIMO, where the horizontal axis represents time. In FIG. 2, a transmitting station apparatus 101 frequently transmits a known signal through an antenna ATt(1) and an antenna ATt(2). A receiving station apparatus 102 estimates CIRs from the known signal received by an antenna ATr(1) and an antenna ATr(2) and feeds back estimation results of the CIRs to the transmitting station apparatus 101. Then, the transmitting station apparatus 101 calculates transmit weights for performing transmit beamforming based on the estimation results of the CIRs and transmits a data signal on which transmit beamforming has been performed using the calculated transmit weights. By repeatedly executing such a series of processing frequently, the transmitting station apparatus 101 and the receiving station apparatus 102 can communicate data signals in which residual inter-stream interferences have been suppressed.

However, if the estimation of CIRs and the update of transmit weights are performed frequently, the time required to feed back the estimation results of CIRs from the receiving station apparatus 102 to the transmitting station apparatus 101 increases. This causes a problem that the time available for communication of data signals is shortened and the transmission rate deteriorates.

On the other hand, the wireless communication system 100 according to each embodiment described later does not frequently feed back the estimation results of CIRs, such that it is possible to suppress residual inter-stream interferences without causing deterioration of the transmission rate. For this purpose, the receiving station apparatus 102 calculates receive weights using equation (7) based on the equivalent CIR matrix obtained through multiplication by the transmit weights shown in equation (4).

[Math. 9]

$$adj\{H(z, t+\tau)adj(H(z, t))\} = \begin{bmatrix} H_{11}(z, t)\{H_{22}(z, t) + \Delta_{22}(z, t+\tau)\} - & H_{12}(z, t)\Delta_{11}(z, t+\tau) - \\ H_{12}(z, t)\{H_{21}(z, t) + \Delta_{21}(z, t+\tau)\} & H_{11}(z, t)\Delta_{12}(z, t+\tau) \\ H_{21}(z, t)\Delta_{22}(z, t+\tau) - & H_{22}(z, t)\{H_{11}(z, t) + \Delta_{11}(z, t+\tau)\} - \\ H_{22}(z, t)\Delta_{21}(z, t+\tau) & H_{21}(z, t)\{H_{12}(z, t) + \Delta_{12}(z, t+\tau)\} \end{bmatrix} \quad (7)$$

Then, by multiplying the equivalent CIR matrix obtained through multiplication by the transmit weights of equation (4) by the receive weights of equation (7) (through receive beamforming processing), off-diagonal elements can be made zero as shown in equation (8) and residual inter-stream interferences can be suppressed.

[Math. 10]

$$adj\{H(z, t+\tau)adj(H(z))\}H(z, t+\tau)adj(H(z)) = \begin{bmatrix} A(z, t+\tau) & 0 \\ 0 & A(z, t+\tau) \end{bmatrix} \quad (8)$$

Thus, the wireless communication system 100 according to the present embodiment does not need to frequently feed back estimation results of CIRs, and when a residual inter-stream interference exceeds a threshold value, the receiving station apparatus 102 obtains an equivalent CIR matrix which is the CIR matrix multiplied by the transmit weights and calculates receive weights from the equivalent CIR matrix to perform receive beamforming processing, such that residual inter-stream interferences can be suppressed without causing deterioration of the transmission rate.

The wireless communication system 100 according to each embodiment determines whether or not to perform a process of suppressing residual inter-stream interferences based on a predetermined threshold value, and when it is necessary to perform the process, calculates receive weights to perform receive beamforming processing.

About Threshold Value

Here, the threshold value for determining whether or not it is necessary to perform the process of suppressing residual inter-stream interferences will be described.

In equation (4) described above, the equivalent CIRs of the residual inter-stream interference components can be expressed by equations (9) and (10).

[Math. 11]

$$H_{11}(z, t)\Delta_{12}(z, t+\tau) - H_{12}(z, t)\Delta_{11}(z, t+\tau) = \sum_{m=0}^{M-1} \xi_{12}^{(m)}(t+\tau)z^{-m} \quad (9)$$

[Math. 12]

$$H_{22}(z, t)\Delta_{21}(z, t+\tau) - H_{21}(z, t)\Delta_{22}(z, t+\tau) = \sum_{m=0}^{M-1} \xi_{21}^{(m)}(t+\tau)z^{-m} \quad (10)$$

Here, M is the length of the equivalent CIR of a residual inter-stream interference component and $\zeta^{(m)}(t+\tau)$ is an m-th component of the equivalent CIR of the residual inter-stream interference component.

At this time, residual inter-stream interference powers $\Xi(t+\tau)$ can be expressed by equations (11) and (12).

[Math. 13]

$$\Xi_{12}(t+\tau) = \sum_{m=0}^{M-1} |\xi_{12}^{(m)}(t+\tau)|^2 \quad (11)$$

[Math. 14]

$$\Xi_{21}(t+\tau) = \sum_{m=0}^{M-1} |\xi_{21}^{(m)}(t+\tau)|^2 \quad (12)$$

In the present embodiment, a threshold value for the power values of equations (11) and (12) is preset and it is determined that it is necessary to suppress residual inter-stream interferences when any of the power values exceeds the threshold value. For example, letting Pth be the threshold value for the power values, it is determined that it is necessary to suppress residual inter-stream interferences when any of inequities (13) and (14) is satisfied.

[Math. 15]

$$\Xi_{12}(t+\tau) > P_{th} \quad (13)$$

[Math. 16]

$$\Xi_{21}(t+\tau) > P_{th} \quad (14)$$

In this manner, the wireless communication system 100 according to the present embodiment determines whether or not to perform the process for suppressing residual inter-stream interferences and calculates receive weights to perform receive beamforming processing when it is necessary to perform the process, such that it is possible to prevent an increase in residual inter-stream interferences due to changes over time.

Figure 3:
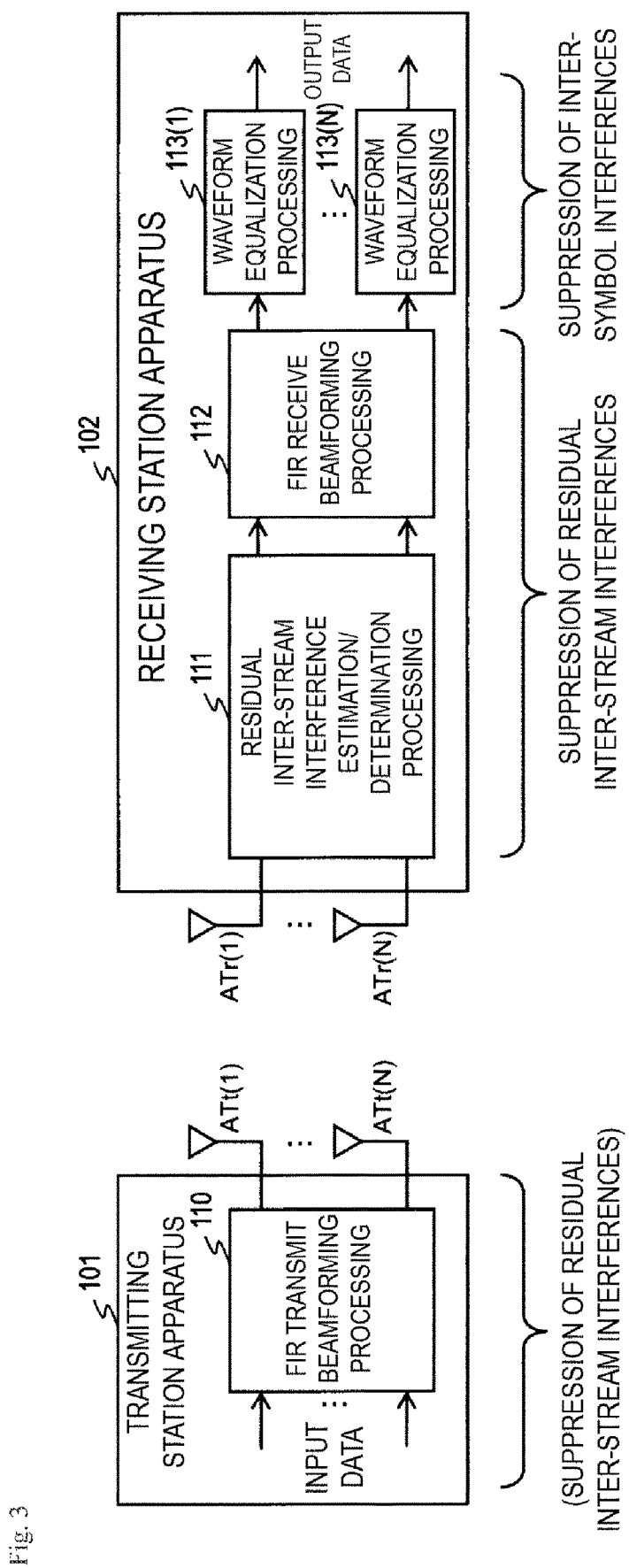
FIG. 3 is a diagram illustrating an example of basic processing of the wireless communication system according to the present embodiment.

FIG. 3 illustrates an example of the basic processing of the wireless communication system 100 according to the present embodiment. A transmitting station apparatus 101 and a receiving station apparatus 102 illustrated in FIG. 3 correspond to those of FIG. 1.

In FIG. 3, the transmitting station apparatus 101 multiplies input data of N streams corresponding to antennas ATt(1) to ATt(N) by transmit weights to perform FIR transmit beamforming processing 110 for removing inter-stream interferences and transmits the resulting signals through the N antennas ATt. On the other hand, the receiving station apparatus 102 performs residual inter-stream interference estimation/determination processing 111 for received signals of the N antennas ATr, that is, the antennas ATr(1) to ATr(N). An estimation process for estimating residual inter-stream interferences and a determination process for determining whether or not an estimation result exceeds a predetermined threshold value are performed in the residual inter-stream interference estimation/determination processing 111. Then, when an estimation result exceeds the threshold value, the received signals of the N antennas ATr, that is, the antennas ATr(1) to ATr(N), are multiplied by the receive weights to perform FIR receive beamforming processing 112 for suppressing residual inter-stream interferences. Then, processes for removing inter-symbol interferences through waveform equalization processing 113(1) to 113(N) are performed for N streams in which residual inter-stream interferences have been suppressed.

As described above, in the wireless communication system 100 according to the present embodiment, the receiving station apparatus 102 estimates residual inter-stream interferences, and when a residual inter-stream interference exceeds a threshold value, calculates receive weights used for receive beamforming processing and performs the receive beamforming processing, such that residual inter-stream interferences due to changes over time are suppressed, thus preventing deterioration of the transmission rate.

Figure 4:
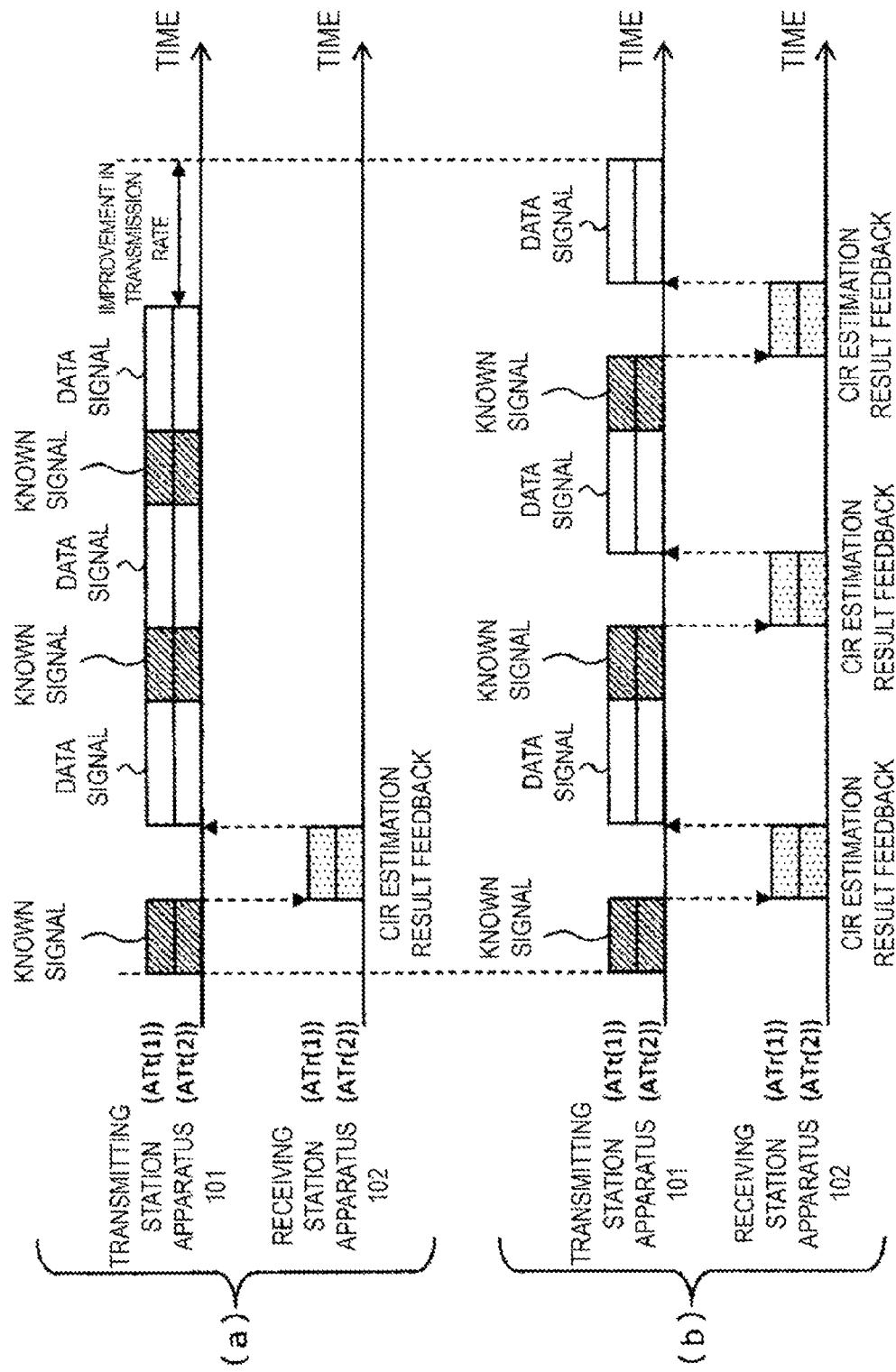
FIG. 4 is a diagram illustrating examples of frame sequences.

FIG. 4 illustrates examples of frame sequences. Similar to FIG. 2, FIG. 4 illustrates examples of 2×2 MIMO, where the horizontal axis represents time. In FIG. 4, a frame sequence of (a) indicates a frame sequence of the wireless communication system 100 according to the present embodiment and a frame sequence of (b) indicates a frame sequence of the comparative example described in FIG. 2.

In the frame sequence of (a), a transmitting station apparatus 101 first transmits a known signal for estimating CIRs of MIMO through an antenna ATt(1) and an antenna ATt(2). This is used to calculate transmit weights for transmit beamforming processing that the transmitting station apparatus 101 performs to remove inter-stream interferences. A receiving station apparatus 102 estimates CIRs (H(z, t)) for the known signals received by an antenna ATr(1) and an antenna ATt(2) and feeds back estimation results of the CIRs to the transmitting station apparatus 101. Then, the transmitting station apparatus 101 calculates transmit weights used for transmit beamforming processing for removing inter-stream interferences based on the estimation results of the CIRs and transmits a data signal on which transmit beamforming has been performed using the calculated transmit weights. The processing up to this point is the same as the frame sequence of (b) of the comparative example. After that, a second known signal is transmitted from the transmitting station apparatus 101. Here, in the frame sequence of (b) of the comparative example, the receiving station apparatus 102 repeatedly performs a series of processing for feeding back the estimation results of CIRs to the transmitting station apparatus 101 again and the transmitting station apparatus 101 updates the transmit weights for removing inter-stream interferences. On the other hand, in the frame sequence of (a) of the present embodiment, the receiving station apparatus 102 calculates a difference ($\Delta(z, t+\tau)$) between estimation results of CIRs ($H(z, t+\tau)$) based on the second known signal (after time $\tau$) from CIR estimations based on the first known signal and the immediate previous (first) estimation results of CIRs ($H(z, t)$) and estimates residual inter-stream interferences due to changes over time of inter-stream interferences during the time T. Then, when a residual inter-stream interference exceeds a predetermined threshold value, the receiving station apparatus 102 calculates receive weights used for receive beamforming processing for suppressing residual inter-stream interferences and performs the receive beamforming processing. The same processing is performed for the third and subsequent known signals.

Here, in the comparative example, the transmit weights for the transmit beamforming processing for removing inter-stream interferences are frequently updated to suppress residual inter-stream interferences due to changes over time. On the other hand, in the wireless communication system 100 according to the present embodiment, the receiving station apparatus 102 estimates residual inter-stream interferences, determines whether or not a residual inter-stream interference exceeds a threshold value, and when a residual inter-stream interference exceeds the threshold value, calculates receive weights and performs the receive beamforming processing to suppress residual inter-stream interferences due to changes over time. As a result, as illustrated in FIG. 4, in the frame sequence of (a) of the present embodiment, it is not necessary to feed back the estimation results of CIRs to the transmitting station apparatus 101 as in the frame sequence of (b) of the comparative example, such that the wireless communication system 100 can devote the time required for feedback to the transmission of data signals.

As described above, the wireless communication system 100 according to the present embodiment has an advantage of improving the transmission rate as compared with the comparative example while suppressing residual inter-stream interferences.

Hereinafter, configurations for realizing the wireless communication system 100 according to the present embodiment described above will be described with some examples.

Exemplary Configuration (1)

Figure 5:
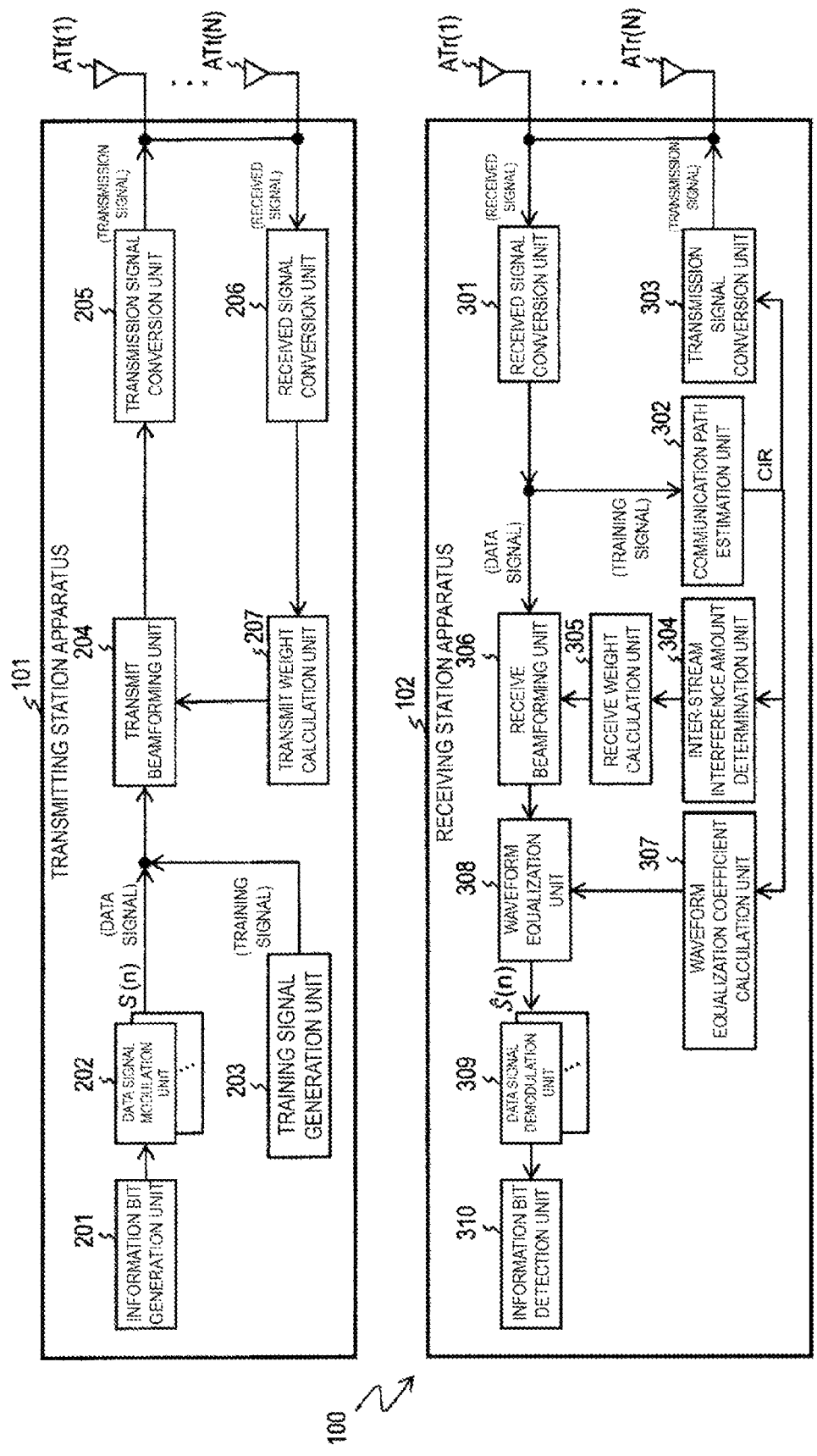
FIG. 5 is a diagram illustrating an exemplary configuration (1) of the wireless communication system according to the present embodiment.

FIG. 5 illustrates an exemplary configuration (1) of the wireless communication system 100 according to the present embodiment. In FIG. 5, the transmitting station apparatus 101 includes an information bit generation unit 201, data signal modulation units 202, a training signal generation unit 203, a transmit beamforming unit 204, a transmission signal conversion unit 205, a received signal conversion unit 206, a transmit weight calculation unit 207, and antennas ATt(1) to ATt(N). The receiving station apparatus 102 includes a received signal conversion unit 301, a communication path estimation unit 302, a transmission signal conversion unit 303, an inter-stream interference amount determination unit 304, a receive weight calculation unit 305, a receive beamforming unit 306, a waveform equalization coefficient calculation unit 307, a waveform equalization unit 308, data signal demodulation units 309, an information bit detection unit 310, and antennas ATr(1) to ATr(N).

First, each component of the transmitting station apparatus 101 will be described.

The information bit generation unit 201 generates data information bits to be transmitted to the receiving station apparatus 102. The data information bits are, for example, a bit string corresponding to a data signal input from the outside (not shown), a data signal generated internally, or the like. The information bit generation unit 201 may have an error correction coding function, an interleaving function that generates an error correction code at a predetermined coding rate, and the like.

The data signal modulation units 202 output data signals S(n) obtained by modulating the bit string output by the information bit generation unit 201 by a predetermined modulation method (for example, quadrature amplitude modulation (QAM)). In the present exemplary configuration (1), the bit string output by the information bit generation unit 201 is divided into a plurality of streams according to the number of antennas ATt and data signals S(n) modulated for the streams are output. Thus, a data signal modulation unit 202 is provided for each stream.

The training signal generation unit 203 generates a training signal (a known signal) for estimating communication path impulse responses (CIRs) and outputs the training signal as each stream (training signal generation processing). The training signal is a predetermined signal obtained by modulating predetermined information such as a preamble for signal detection (for example, a specific pattern such as an alternating pattern of "01") by a modulation method such as phase shift keying (PSK) that is less susceptible to interferences, and is used by the receiving station apparatus 102 to estimate CIRs. The training signal information transmitted by the transmitting station apparatus 101 is known and shared with the receiving station apparatus 102 in advance.

The transmit beamforming unit 204 performs transmit beamforming processing for removing inter-stream interferences on data signals output by the data signal modulation units 202 based on transmit weights calculated by the transmit weight calculation unit 207 which will be described later. The transmit beamforming unit 204 may have a function of normalizing the transmission power. Whether or not the training signal output by the training signal generation unit 203 is subjected to transmit beamforming processing to be transmitted is selected by a communication path estimation method which will be described later.

The transmission signal conversion unit 205 performs conversion for transmitting signals generated by the above signal processing through antennas. The transmission signal conversion unit 205 frequency-converts data signals or training signals output by the transmit beamforming unit 204 into high-frequency transmission signals for transmission through the antennas ATt. For example, the transmission signal conversion unit 205 up-converts data signals or training signals in a 20 MHz band into high frequency signals in a 5 GHz band and transmits them through the antennas ATt. Here, the plurality of divided streams are converted into high-frequency signals and transmitted through the antennas ATt(1) to ATt(N).

The received signal conversion unit 206 frequency-converts the high-frequency received signals received through the antennas ATt(1) to ATt(N) into low-frequency baseband signals. For example, the received signal conversion unit 206 down-converts high frequency signals in the 5 GHz band and outputs baseband signals in the 20 MHz band. Here, in the present exemplary configuration (1), the received signal conversion unit 206 accepts received signals including information of CIRs or the like from the receiving station apparatus 102, converts them into baseband signals, and outputs the baseband signals to the transmit weight calculation unit 207 which will be described later. The received signal conversion unit 206 or the transmit weight calculation unit 207 may have the functions of the demodulation units that demodulate information of CIRs or the like from the baseband signals.

Using the CIRs estimated by the receiving station apparatus 102, the transmit weight calculation unit 207 calculates transmit weights for the transmit beamforming unit 204 to perform transmit beamforming processing. As in the wireless communication system 100 of the exemplary configuration (2) which will be described later, the transmit weights may be calculated by the receiving station apparatus 102 and fed back to the transmitting station apparatus 101.

As described above, the transmitting station apparatus 101 transmits a training signal for estimating CIRs and receives the estimation results of CIRs from the receiving station apparatus 102, and thus can transmit a data signal, on which transmit beamforming processing has been performed using transmit weights for removing inter-stream interferences calculated based on the estimation results of CIRs, to the receiving station apparatus 102.

Next, each component of the receiving station apparatus 102 will be described.

The received signal conversion unit 301 performs conversion for signal processing of signals received by antennas. The received signal conversion unit 301 frequency-converts high-frequency signals received by the antennas ATr into baseband signals, similar to the received signal conversion unit 206 of the transmitting station apparatus 101. Here, the received signal conversion unit 301 outputs training signals received from the transmitting station apparatus 101 to the communication path estimation unit 302 and outputs data signals received from the transmitting station apparatus 101 to the receive beamforming unit 306 which will be described later. Here, the received signal conversion unit 301 frequency-converts the high-frequency signals received through the antennas ATr(1) to ATr(N) into baseband signals.

The communication path estimation unit 302 estimates CIRs based on a training signal transmitted from the transmitting station apparatus 101 (communication path estimation processing). The estimation results of CIRs are output to both the inter-stream interference amount determination unit 304 and the waveform equalization coefficient calculation unit 307 which will be described later and are also transmitted to the transmitting station apparatus 101 through the transmission signal conversion unit 303 and then input to the transmit weight calculation unit 207 of the transmitting station apparatus 101. The communication path estimation unit 302 may estimate equivalent CIRs for signals on which transmit beamforming processing has been performed, depending on a communication path estimation method which will be described later.

The transmission signal conversion unit 303 has the same function as the transmission signal conversion unit 205 of the transmitting station apparatus 101, converts information of CIRs or the like output by the communication path estimation unit 302 into high-frequency signals, and transmits them through the antennas ATr. For example, in the present exemplary configuration (1), the transmission signal conversion unit 303 transmits information of CIRs estimated by the communication path estimation unit 302 through the antennas ATr to the transmitting station apparatus 101. The transmission signal conversion unit 303 or the communication path estimation unit 302 may have the functions of the modulation units that modulate the information of CIRs into baseband signals. When the receiving station apparatus 102 calculates transmit weights as in the wireless communication system 100 of the exemplary configuration (2) which will be described later, the transmission signal conversion unit 303 transmits information of the transmit weights through the antennas ATr to the transmitting station apparatus 101.

The inter-stream interference amount determination unit 304 calculates the amounts of residual inter-stream interferences as described in equations (9) to (12) based on the CIRs estimated by the communication path estimation unit 302 and compares the calculated amounts of residual inter-stream interferences with a predetermined threshold value to determine whether or not it is necessary to suppress residual inter-stream interferences (inter-stream interference amount determination processing). When the suppression of residual inter-stream interferences is performed, the inter-stream interference amount determination unit 304 outputs the estimation results of CIRs to the receive weight calculation unit 305.

When the inter-stream interference amount determination unit 304 has output the estimation results of CIRs, the receive weight calculation unit 305 calculates receive weights used for the receive beamforming processing for suppressing residual inter-stream interferences and sets the calculated receive weights in the receive beamforming unit 306 (receive weight calculation processing). For example, the receive weights are calculated by equation (7) as an adjugate matrix of the equivalent CIR matrix of equation (4) described above.

The receive beamforming unit 306 performs the receive beamforming processing using the receive weights calculated by the receive weight calculation unit 305.

The waveform equalization coefficient calculation unit 307 calculates equalization weights for removing inter-symbol interferences using the CIRs estimated by the communication path estimation unit 302. Which input is needed here differs depending on the waveform equalization method.

The waveform equalization unit 308 performs equalization processing for removing inter-symbol interferences of the received signals output by the receive beamforming unit 306 using the equalization weights calculated by the waveform equalization coefficient calculation unit 307. The receive beamforming processing and the waveform equalization processing may be performed together as in the exemplary configuration (3) which will be described later.

The data signal demodulation units 309 demodulate data signals S^(n) output by the waveform equalization unit 308 into information bits and outputs a bit string. The waveform equalization unit 308 outputs data signals S^(n) of a plurality of streams according to the number of antennas ATr and the data signal demodulation units 309 demodulate the data signals S^(n) of the streams. Then, the data signal demodulation units 309 combine bit strings that have been divided into a plurality of streams in the transmitting station apparatus 101 and output the combined bit string to the information bit detection unit 310. The data signal demodulation units 309 may have an error correction/decoding function and a deinterleaving function depending on the function of the transmitting station apparatus 101.

The information bit detection unit 310 outputs received data obtained by converting the bit string output by the data signal demodulation units 309 into digital data. Here, the information bit detection unit 310 may perform an error correction/decoding function and a deinterleaving function.

As described above, the receiving station apparatus 102 estimates CIRs from a known signal transmitted by the transmitting station apparatus 101 and feeds back the estimation results of CIRs to the transmitting station apparatus 101, and when the amount of an inter-stream interference exceeds a predetermined threshold value, calculates receive weights to perform receive beamforming processing, such that residual inter-stream interferences can be suppressed.

Exemplary Configuration (2)

Figure 6:
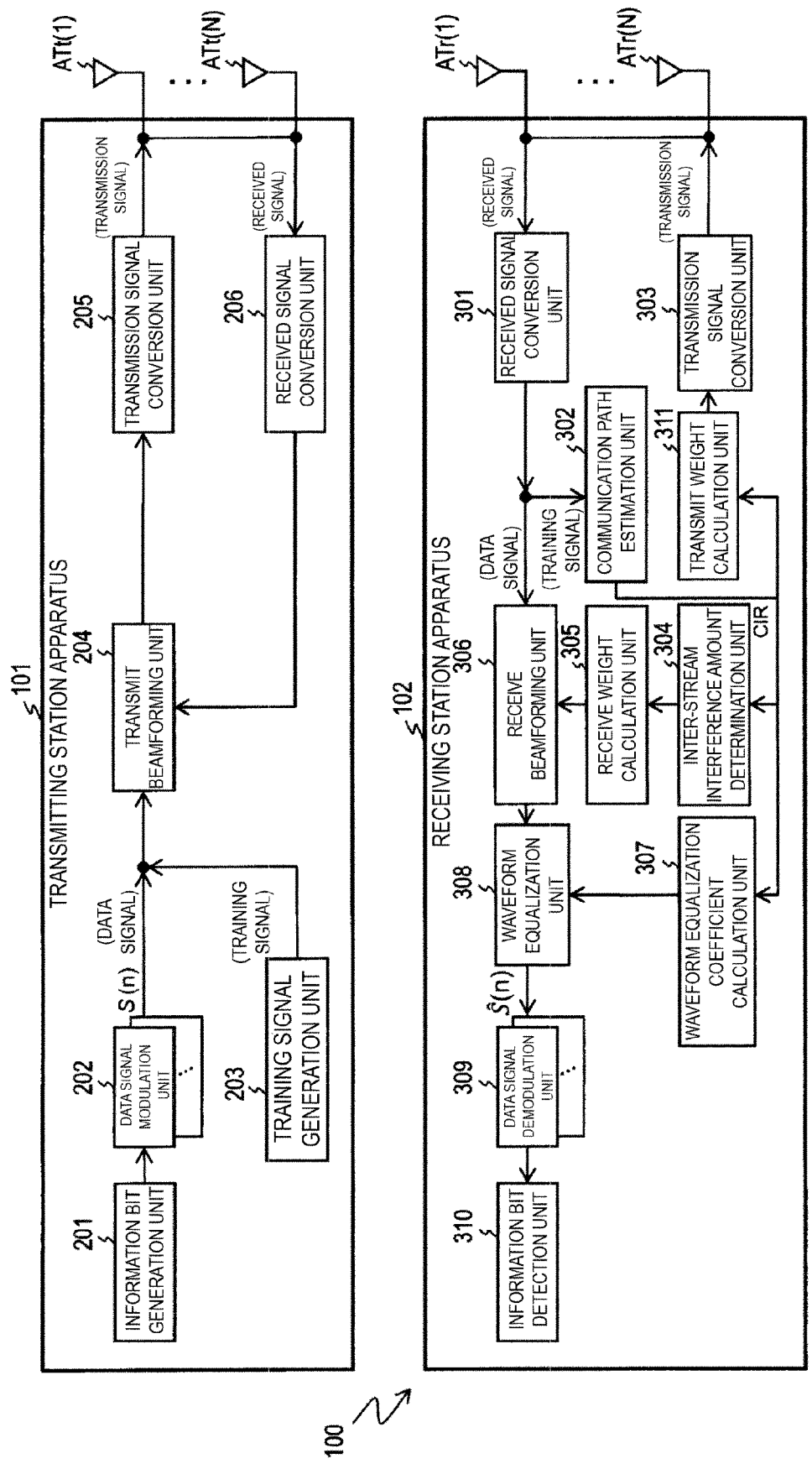
FIG. 6 is a diagram illustrating an exemplary configuration (2) of the wireless communication system according to the present embodiment.

FIG. 6 illustrates an exemplary configuration (2) of the wireless communication system 100 according to the present embodiment. In the exemplary configuration (2) of FIG. 6, a transmit weight calculation unit 311 is disposed in the receiving station apparatus 102, instead of the transmit weight calculation unit 207 in the transmitting station apparatus 101 of the exemplary configuration (1) illustrated in FIG. 5. Each block other than the transmit weight calculation unit 311 operates in the same manner as in the case of the exemplary configuration (1) of FIG. 5 and thus the duplicate description will be omitted.

In FIG. 6, using CIRs estimated by the communication path estimation unit 302, the transmit weight calculation unit 311 calculates transmit weights for the transmit beamforming unit 204 of the transmitting station apparatus 101 to perform transmit beamforming processing. Then, the transmit weight calculation unit 311 transmits the calculated transmit weights to the transmitting station apparatus 101 through the transmission signal conversion unit 303. The transmit weights received through the received signal conversion unit 206 in the transmitting station apparatus 101 are output to the transmit beamforming unit 204.

In the present exemplary configuration (2) as well, the receiving station apparatus 102 calculates the amounts of residual inter-stream interferences based on the estimation results of CIRs, and when the amount of a residual inter-stream interference exceeds a predetermined threshold value, calculates receive weights and performs receive beamforming processing through the receive beamforming unit 306. This allows the receiving station apparatus 102 to suppress residual inter-stream interferences as in the exemplary configuration (1).

Exemplary Configuration (3)

Figure 7:
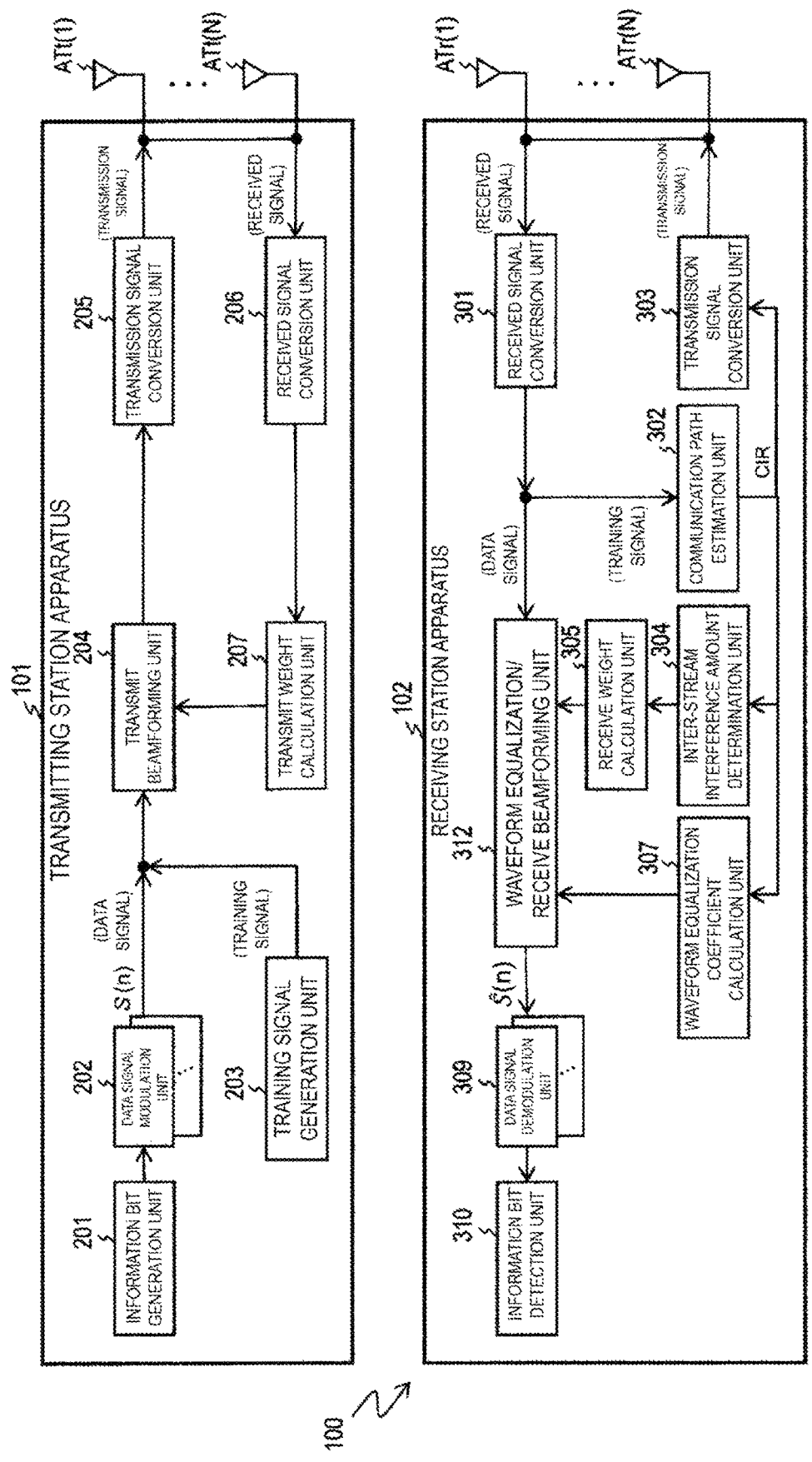
FIG. 7 is a diagram illustrating an exemplary configuration (3) of the wireless communication system according to the present embodiment.

FIG. 7 illustrates an exemplary configuration (3) of the wireless communication system 100 according to the present embodiment. In the exemplary configuration (3) of FIG. 7, a waveform equalization/receive beamforming unit 312 is disposed, which integrates the receive beamforming unit 306 and the waveform equalization unit 308 in the receiving station apparatus 102 in the exemplary configuration (1) illustrated in FIG. 5. Each block other than the waveform equalization/receive beamforming unit 312 operates in the same manner as in the case of the exemplary configuration (1) of FIG. 5 and thus the duplicate description will be omitted.

In FIG. 7, the waveform equalization/receive beamforming unit 312 integrates receive weights output by the receive weight calculation unit 305 and equalization weights output by the waveform equalization coefficient calculation unit 307 and uses the integrated weights as weights of a single FIR equalizer. This allows the receive beamforming processing and the waveform equalization processing to be performed at the same time, such that the configuration of the receiving station apparatus 102 can be simplified.

In the present exemplary configuration (3) as well, the receiving station apparatus 102 calculates the amounts of residual inter-stream interferences based on the estimation results of CIRs, and when the amount of a residual inter-stream interference exceeds a predetermined threshold value, calculates receive weights and performs receive beamforming processing together with equalization processing through the waveform equalization/receive beamforming unit 312. This allows the receiving station apparatus 102 to suppress residual inter-stream interferences as in the exemplary configuration (1).

Exemplary Process (1)

Figure 8:
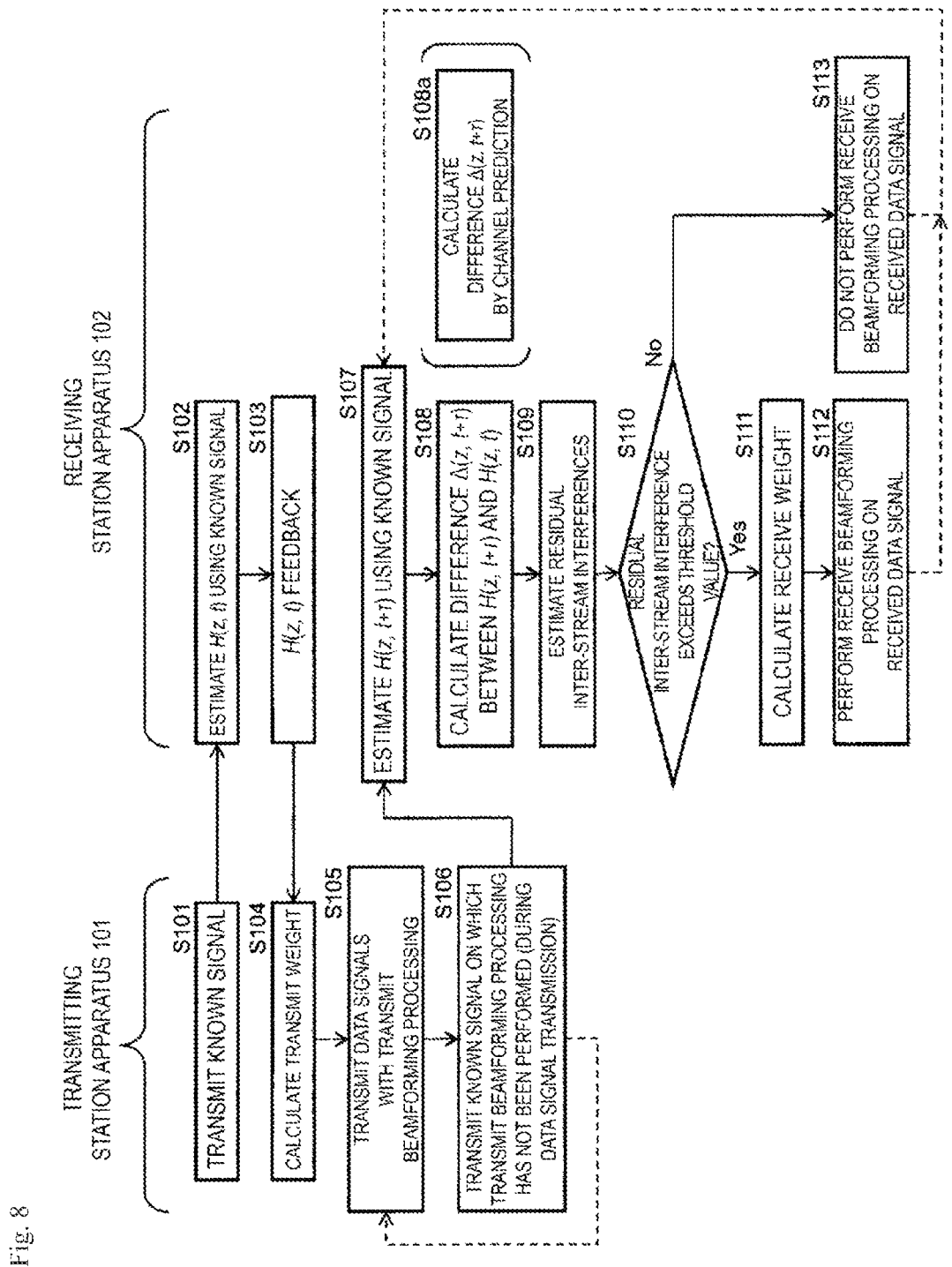
FIG. 8 is a diagram illustrating an exemplary process (1) of the wireless communication system according to the present embodiment.

FIG. 8 illustrates an exemplary process (1) of the wireless communication system 100 according to the present embodiment. The process illustrated in FIG. 8 is executed by the components of the wireless communication system 100 described in the exemplary configurations (1) to (3) of FIGS. 5 to 7. In the exemplary configuration (2) of FIG. 6, the processing of step S104 that will be described below is executed by the receiving station apparatus 102.

In step S101, the training signal generation unit 203 of the transmitting station apparatus 101 generates a known signal before data communication and transmits it to the receiving station apparatus 102.

In step S102, the communication path estimation unit 302 of the receiving station apparatus 102 estimates CIRs (H(z, t)) (corresponding to first communication path responses) using the known signal transmitted from the transmitting station apparatus 101 in step S101.

In step S103, the communication path estimation unit 302 of the receiving station apparatus 102 feeds back the estimated CIRs (H(z, t)) to the transmitting station apparatus 101. In the exemplary configuration (2) of FIG. 6, the communication path estimation unit 302 outputs the CIRs (H(z, t)) to the transmit weight calculation unit 311.

In step S104, the transmit weight calculation unit 207 of the transmitting station apparatus 101 calculates transmit weights based on the CIRs (H(z, t)) fed back from the receiving station apparatus 102. In the exemplary configuration (2) of FIG. 6, the transmit weight calculation unit 311 of the receiving station apparatus 102 calculates the transmit weights and feeds them back to the transmitting station apparatus 101.

In step S105, the transmit beamforming unit 204 of the transmitting station apparatus 101 transmits a data signal on which transmit beamforming processing has been performed using the transmit weights calculated in step S104.

In step S106, the training signal generation unit 203 of the transmitting station apparatus 101 transmits a known signal on which transmit beamforming processing has not been performed during the transmission of the data signal (during data communication). The transmitting station apparatus 101 returns to step S105 and repeatedly executes the same process.

In step S107, the communication path estimation unit 302 of the receiving station apparatus 102 estimates CIRs (H(z, t+τ)) (corresponding to second communication path responses) using the known signal transmitted from the transmitting station apparatus 101 in step S106.

In step S108, the inter-stream interference amount determination unit 304 of the receiving station apparatus 102 calculates a difference Δ(z, t+τ) between H(z, t+τ) and H(z, t). In FIG. 8, the processing of step S108 may be replaced with that of step S108a and the inter-stream interference amount determination unit 304 may perform channel prediction using a method such as extrapolation based on a linear interpolation formula and calculate the difference Δ(z, t+τ) between H(z, t+τ) and H(z, t).

In step S109, the inter-stream interference amount determination unit 304 of the receiving station apparatus 102 estimates residual inter-stream interferences based on the difference Δ(z, t+τ) calculated in step S108. For example, the inter-stream interference amount determination unit 304 multiplies the CIR matrix at time t+τ described in equation (6) by the adjugate matrix of the CIR matrix (transmit weights) at time t to calculate the equivalent CIR matrix described in equation (4) and estimates off-diagonal elements of the equivalent CIR matrix as residual inter-stream interferences.

In step S110, the inter-stream interference amount determination unit 304 of the receiving station apparatus 102 determines whether or not a residual inter-stream interference estimated in step S109 exceeds a threshold value and the process proceeds to the processing of step S111 when a residual inter-stream interference exceeds the threshold value. If the threshold value is not exceeded, the process proceeds to step S113.

In step S111, the receive weight calculation unit 305 of the receiving station apparatus 102 calculates receive weights. The receive weights are calculated by equation (7) as an adjugate matrix of the equivalent CIR matrix of equation (4) described above.

In step S112, the receive beamforming unit 306 of the receiving station apparatus 102 performs receive beamforming processing on the received data signal and outputs the resulting signal to the waveform equalization unit 308. In the exemplary configuration (3) of FIG. 7, the waveform equalization/receive beamforming unit 312 performs the receive beamforming processing and the waveform equalization processing.

In step S113, the receive beamforming unit 306 of the receiving station apparatus 102 does not perform the receive beamforming processing on the received data signal. That is, the data signal output by the received signal conversion unit 301 skips the receive beamforming unit 306 and is input to the waveform equalization unit 308. In the exemplary configuration (3) of FIG. 7, the waveform equalization/receive beamforming unit 312 performs only the waveform equalization processing without performing the receive beamforming processing.

Here, upon receiving the next known signal after performing the processing of steps S112 and S113, the receiving station apparatus 102 returns to step S107 and repeatedly executes the same process. That is, the receiving station apparatus 102 determines whether or not a residual inter-stream interference exceeds the threshold value each time a known signal is received and selects whether or not to perform receive beamforming processing on the received data signal.

The wireless communication system 100 according to the present exemplary process (1) can suppress residual inter-stream interferences by estimating residual inter-stream interferences and calculating receive weights when a residual inter-stream interference exceeds a predetermined threshold value in the above manner. In particular, the wireless communication system 100 according to the present exemplary process (1) improves the transmission efficiency because it is necessary to feed back CIRs estimated by the receiving station apparatus 102 to the transmitting station apparatus 101 only at the beginning and it is unnecessary to frequently feed back CIRs to the transmitting station apparatus 101 as in the comparative example.

Exemplary Process (2)

Figure 9:
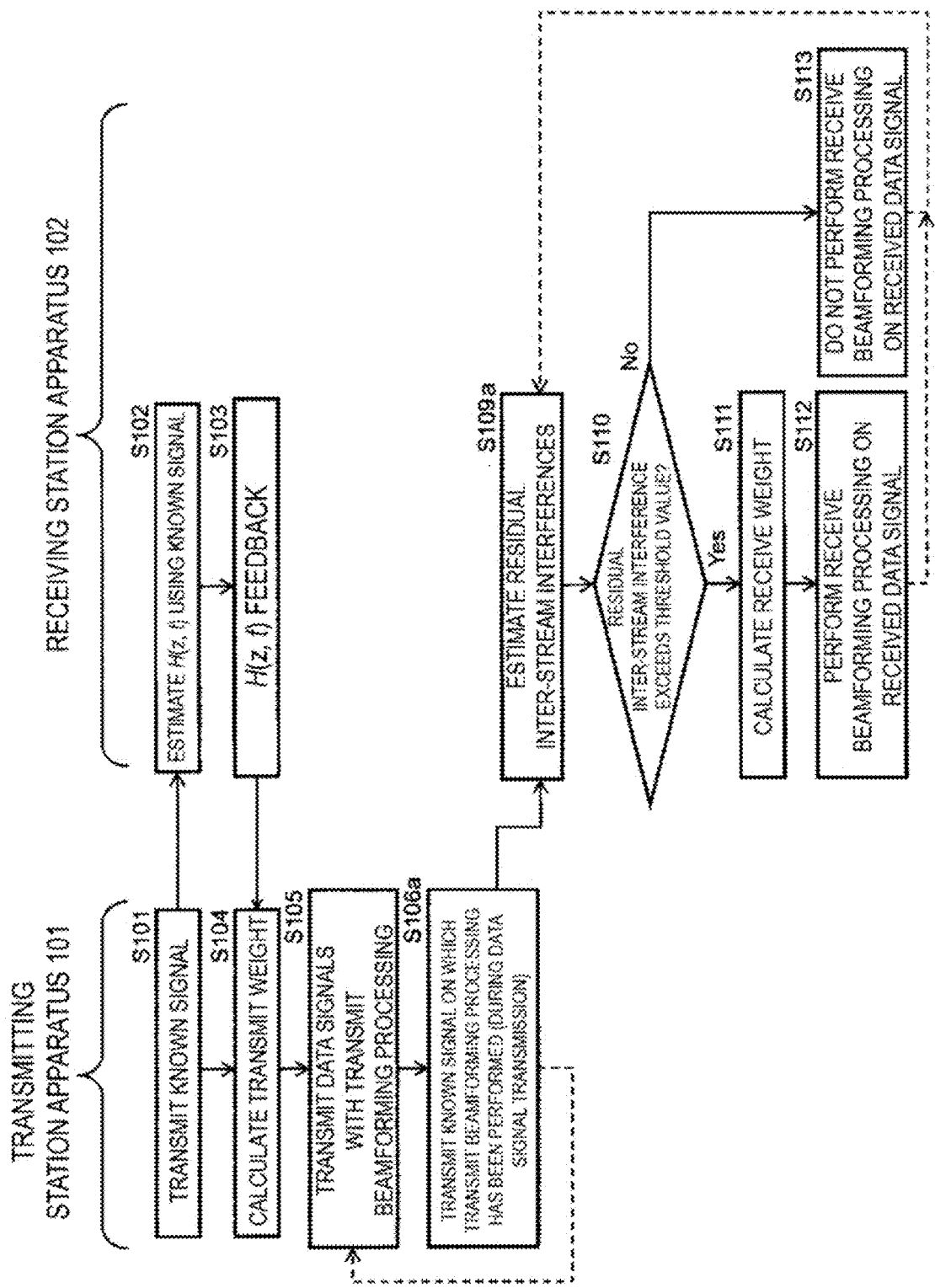
FIG. 9 is a diagram illustrating an exemplary process (2) of the wireless communication system according to the present embodiment.

FIG. 9 illustrates an exemplary process (2) of the wireless communication system 100 according to the present embodiment. The process illustrated in FIG. 9 is executed by the components of the wireless communication system 100 described in the exemplary configurations (1) to (3) of FIGS. 5 to 7. In the exemplary configuration (2) of FIG. 6, the processing of step S104 that will be described below is executed by the receiving station apparatus 102.

The difference between the exemplary process (2) of FIG. 9 and the exemplary process (1) of FIG. 8 is that the processing of steps S106a and S109a of FIG. 9 is executed instead of the processing of steps S106 and 109 of FIG. 8 and the processing of steps S107 and S108 of FIG. 8 is not performed in FIG. 9. In FIG. 9, other processing is performed in the same manner as the processing of FIG. 8.

In step S106a, the transmitting station apparatus 101 transmits a known signal on which transmit beamforming processing has been performed during the transmission of the data signal.

In step S109a, the receiving station apparatus 102 estimates residual inter-stream interferences using the known signal, on which transmit beamforming processing has been performed, transmitted from the transmitting station apparatus 101 in step S106a. Here, the CIRs of the known signal on which transmit beamforming processing has been performed are represented by the matrix expressed by equation (4) above.

Then, in step S110, the receiving station apparatus 102 determines whether or not a residual inter-stream interference exceeds the threshold value, and when a residual inter-stream interference exceeds the threshold value, calculates receive weights and performs receive beamforming processing (steps S111 and S112), and when none of the residual inter-stream interferences exceeds the threshold value, does not perform receive beamforming processing (step S113).

In the present exemplary process (2), the transmitting station apparatus 101 transmits a known signal on which the transmit beamforming processing for removing inter-stream interferences has been performed as described above, such that residual inter-stream interferences estimated by the receiving station apparatus 102 correspond to components varying over time as they are and there is no need to calculate a difference from the CIRs of time ti ago. This allows processing performed by the receiving station apparatus 102 to be simplified as compared with the exemplary process (1).

As described above in each embodiment, the wireless communication system, the wireless communication method, and the receiving station apparatus according to the present invention can avoid deterioration of communication quality by suppressing residual inter-stream interferences caused by changes of channels over time without causing deterioration of the transmission rate in the wireless communication system for performing SC-MIMO transmission using FIR beamforming.

Each of the transmitting station apparatus 101 and the receiving station apparatus 102 in the above embodiments is not necessarily realized by a dedicated apparatus and may be realized by a general-purpose computer. In this case, a program for realizing their functions may be recorded on a computer-readable recording medium and the program recorded on the recording medium may be read and executed by a computer system to realize the functions.

It is apparent that the above embodiments are merely examples of the present invention and the present invention is not limited to the above embodiments. Thus, components may be added, omitted, replaced, or otherwise modified without departing from the spirit and scope of the present invention.

REFERENCE SIGNS LIST

100 Wireless communication system
101 Transmitting station apparatus
102 Receiving station apparatus
201 Information bit generation unit
202 Data signal modulation unit
203 Training signal generation unit
204 Transmit beamforming unit
205, 303 Transmission signal conversion unit
206, 301 Received signal conversion unit
ATt, ATr Antenna
302 Communication path estimation unit
304 Inter-stream interference amount determination unit
305 Receive weight calculation unit
306 Receive beamforming unit
307 Waveform equalization coefficient calculation unit
308 Waveform equalization unit
309 Data signal demodulation unit
310 Information bit detection unit

The invention claimed is:

1. A wireless communication system for performing single-carrier multiple-input multiple-output (MIMO) transmission between a transmitting station apparatus and a receiving station apparatus, the transmitting station apparatus including:
a processor; and
a storage medium having computer program instructions stored thereon, when executed by the processor, perform to:
generate a predetermined known signal shared with the receiving station apparatus; and
perform transmit beamforming processing using a transmit weight for removing an inter-stream interference, the transmit weight being calculated based on a communication path response that the receiving station apparatus has estimated from the known signal, and the receiving station apparatus including:
a processor; and
a storage medium having computer program instructions stored thereon, when executed by the processor, perform to:
estimate the communication path response based on the known signal received from the transmitting station apparatus;
determine whether or not a residual inter-stream interference estimated based on the known signal transmitted from the transmitting station apparatus exceeds a predetermined threshold value;
calculate a receive weight used for receive beamforming processing for suppressing residual inter-stream interferences when the residual inter-stream interference exceeds the threshold value; and
receive beamforming processing for suppressing residual inter-stream interferences using the receive weight.

2. The wireless communication system according to claim 1, wherein the computer program instructions of the transmitting station apparatus further perform to
transmit the known signal on which transmit beamforming processing has not been performed during data communication, and
the computer program instructions of the receiving station apparatus further perform to
set the communication path response estimated when calculating the transmit weight before data communication as a first communication path response and estimate a second communication path response from the known signal on which transmit beamforming processing has not been performed, the known signal being received during data communication, and
calculate a difference between the first communication path response and the second communication path response to estimate a residual inter-stream interference and determine whether or not the estimated residual inter-stream interference exceeds a predetermined threshold value.

3. The wireless communication system according to claim 1, wherein the computer program instructions of the transmitting station apparatus further perform to transmit the known signal on which transmit beamforming processing has been performed during data communication,
and the computer program instructions of the receiving station apparatus further perform to
estimate an equivalent communication path response from the known signal on which transmit beamforming processing has been performed, the known signal being received during data communication, and
calculate an off-diagonal element of a matrix of the equivalent communication path response as a residual inter-stream interference component and determine whether or not a power value of the calculated residual inter-stream interference component exceeds a predetermined threshold value.

4. A wireless communication method for performing single-carrier multiple-input multiple-output (MIMO) transmission between a transmitting station apparatus and a receiving station apparatus, the method comprising:
generating, by the transmitting station apparatus, a predetermined known signal shared with the receiving station apparatus; and
performing, by the transmitting station apparatus, transmit beamforming processing using a transmit weight for removing an inter-stream interference, the transmit weight being calculated based on a communication path response that the receiving station apparatus has estimated from the known signal, and
estimating, by the receiving station apparatus, the communication path response based on the known signal received from the transmitting station apparatus;
determining, by the receiving station apparatus, whether or not a residual inter-stream interference estimated based on the known signal transmitted from the transmitting station apparatus exceeds a predetermined threshold value;

calculating, by the receiving station apparatus, a receive weight used for receive beamforming processing for suppressing residual inter-stream interferences in response to the residual inter-stream interference exceeding the threshold value; and suppressing, by the receiving station apparatus, residual inter-stream interferences using the receive weight.

5. The wireless communication method according to claim 4, wherein the known signal on which transmit beamforming processing has not been performed during data communication is transmitted, the communication path response estimated when the transmit weight before data communication is calculated is set as a first communication path response and a second communication path response is estimated from the known signal on which transmit beamforming processing has not been performed, the known signal being received during data communication, and a difference between the first communication path response and the second communication path response is calculated to estimate a residual inter-stream interference and whether or not the estimated residual inter-stream interference exceeds a predetermined threshold value is determined.

6. The wireless communication method according to claim 4, wherein the known signal on which transmit beamforming processing has been performed during data communication is transmitted, an equivalent communication path response is estimated from the known signal on which transmit beamforming processing has been performed, the known signal being received during data communication, and an off-diagonal element of a matrix of the equivalent communication path response is calculated as a residual inter-stream interference component and whether or not a power value of the calculated residual inter-stream interference component exceeds a predetermined threshold value is determined.

7. A receiving station apparatus for performing single-carrier multiple-input multiple-output (MIMO) transmission with a transmitting station apparatus, the receiving station apparatus comprising:

a processor; and a storage medium having computer program instructions stored thereon, when executed by the processor, perform to:

estimate a communication path response based on a predetermined known signal received from the transmitting station apparatus;

determine whether or not a residual inter-stream interference estimated based on the known signal transmitted from the transmitting station apparatus exceeds a predetermined threshold value;

calculate a receive weight used for receive beamforming processing for suppressing residual inter-stream interferences in response to the residual inter-stream interference exceeding the threshold value; and perform receive beamforming processing for suppressing residual inter-stream interferences using the receive weight.

* * * * *